United States Patent
Eggleston et al.

(10) Patent No.: US 10,178,906 B2
(45) Date of Patent: Jan. 15, 2019

(54) REVERSIBLY INTERLOCKING CARABINER DEVICE

(71) Applicants: Trisha Eggleston, San Ramon, CA (US); Joshua Eggleston, Bakersfield, CA (US)

(72) Inventors: Trisha Eggleston, San Ramon, CA (US); Joshua Eggleston, Bakersfield, CA (US)

(73) Assignee: Trisha Eggleston, Oakland, CA (US)

( * ) Notice: Subject to any disclaimer, the term of this patent is extended or adjusted under 35 U.S.C. 154(b) by 85 days.

(21) Appl. No.: 15/587,559

(22) Filed: May 5, 2017

(65) Prior Publication Data

US 2018/0317639 A1    Nov. 8, 2018

(51) Int. Cl.
*A45F 5/02* (2006.01)
*A45F 5/10* (2006.01)
*A63C 11/10* (2006.01)

(52) U.S. Cl.
CPC .............. *A45F 5/021* (2013.01); *A45F 5/102* (2013.01); *A45F 2005/023* (2013.01); *A63C 11/10* (2013.01); *Y10T 24/1397* (2015.01); *Y10T 24/318* (2015.01); *Y10T 24/4005* (2015.01); *Y10T 24/45204* (2015.01)

(58) Field of Classification Search
CPC .............. Y10T 24/45204; Y10T 24/318; Y10T 24/1397; Y10T 24/4005; A45F 2005/023; A45F 2005/006; A45F 5/021; A45F 5/102; A63C 11/10
See application file for complete search history.

(56) References Cited

U.S. PATENT DOCUMENTS

| 5,005,266 A * | 4/1991 | Fister ...................... F16B 45/02 24/599.8 |
| 2014/0259551 A1* | 9/2014 | Egbert ...................... A45F 3/14 24/302 |
| 2015/0164204 A1* | 6/2015 | Moreau ...................... A45F 5/00 224/267 |

* cited by examiner

*Primary Examiner* — Robert Sandy

(57) ABSTRACT

The disclosure provides a reversibly interlocking device for attaching one or more objects to a strap, which includes a first carabiner including a first base portion with a first strap attachment, a first proximal end including at least one lip, and a first distal end including two or more tabs; and a second carabiner including a second base portion with a second strap attachment, a second proximal end, and a second distal end, wherein the first carabiner reversibly interlocks with the second carabiner through the at least one lip and the second distal end, and through the two or more tabs and the second proximal end.

16 Claims, 4 Drawing Sheets

REVERSIBLY INTERLOCKING CARABINER DEVICE

TECHNICAL FIELD OF THE INVENTION

The disclosure generally relates to a carabiner, and more particularly, to a reversibly interlocking carabiner device, wherein two carabiners can be interlocked together and used as a belt buckle with a waist belt or strap and unlocked for attaching or securing one or more objects to the waist belt or strap through the unlocked carabiners.

BACKGROUND OF THE INVENTION

Backcountry snowboarding and skiing often require a user to hike up hills carrying their boards, skis and other equipment using their hands and arms. Oftentimes, these hills are covered in snow and ice and can be very slippery. Thus, having their hands and arms free for balance and control is important for the safety of the user. Even at resort settings, carrying snowboards and skis as well as boots, gloves, helmets and other snow gear to and from a parking lot can be cumbersome, often requiring the use of both hands and arms.

Thus, to make the transportation of sporting gear and other objects more convenient and safe for the user, what is needed is a device that can secure these objects to the user such that the user may have their hands and arms free for balance and control.

SUMMARY OF THE INVENTION

The present disclosure seeks to overcome the foregoing disadvantages in an improved manner over commonly known devices. To make the transportation of sporting gear and other objects more convenient and safe, the present disclosure provides a reversibly interlocking carabiner device having a waist belt or strap that includes two carabiners at each end. The two carabiners of can be reversibly interlocked together and used as a belt buckle with the waist belt or strap and unlocked for attaching or securing sporting gear and/or other objects to the waist belt or strap through the unlocked carabiners.

Thus, in one embodiment the disclosure provides a reversibly interlocking carabiner device for attaching one or more objects to a strap, which includes a first carabiner having a first base portion with a first strap attachment, a first proximal end including at least one lip, and a first distal end including two or more tabs; and a second carabiner including a second base portion with a second strap attachment, a second proximal end, and a second distal end, wherein the first carabiner reversibly interlocks with the second carabiner through the at least one lip interacting with the second distal end, and through the two or more tabs interacting with the second proximal end.

In another embodiment the disclosure provides a system, which includes a first carabiner including a first base portion with a first strap attachment, a first proximal end including at least one lip, and a first distal end including two or more tabs; a second carabiner including a second base portion with a second strap attachment, a second proximal end, and a second distal end; and at least one strap having a first end and a second end, wherein the at least one strap attaches to the first strap attachment through one or more openings in first strap attachment, and the at least one strap attaches to the second strap attachment through one or more openings in the second strap attachment, wherein the first carabiner reversibly interlocks with the second carabiner through the at least one lip interacting with the second distal end, and through the two or more tabs interacting with the second proximal end.

DETAILED DESCRIPTION OF THE EMBODIMENTS

Figure 1:
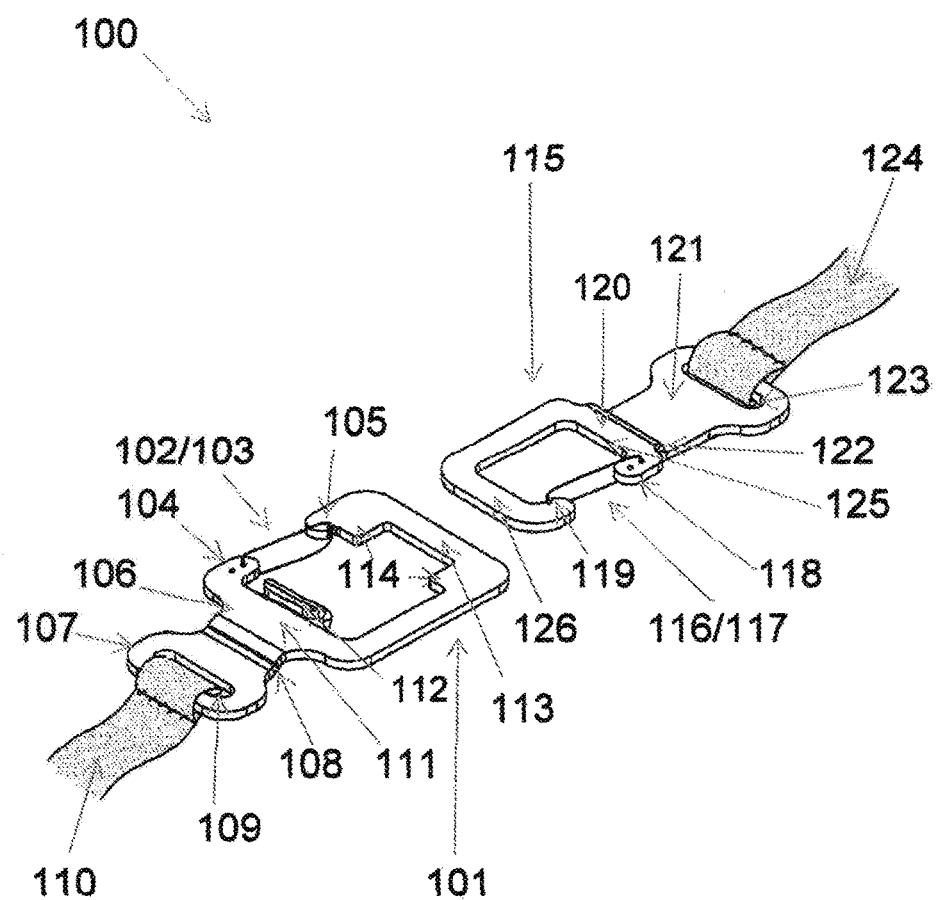
FIG. 1 illustrates an embodiment of a top view of an unlocked reversibly interlocking carabiner device for attaching or securing an object to a strap.

The present disclosure provides a reversibly interlocking carabiner device having a waist belt or strap that includes two carabiners at each end. The two carabiners of the device can be reversibly interlocked together and used as a belt buckle with the waist belt or strap and unlocked for attaching or securing sporting gear and other objects to the waist belt or strap through the unlocked carabiners. The two carabiners can be attached or secured onto various objects such that the user can sling the strap portion onto one shoulder or across both shoulders allowing the user's hands and arms to be free for other purposes. The disclosure provides a system of two reversibly interlocking carabiners that can be worn as a belt buckle when not in use, thereby converting the carrying strap to a waist belt, and vice-versa. This allows the strap to be easily accessible and readily available to the user at all times.

The two carabiners can be reversibly interlocked together in order to fit as a belt buckle and still be comfortable enough to wear without digging into the belly of the user when the two carabiners are interlocked. This is achieved by interlocking the two carabiners, one on top of the other in a parallel plane, but in opposite orientations. That is, the two carabiners reversibly interlock together in a position such that the openings or the gate of each of the carabiners face in the opposite direction thereby providing a stationary, non-moving edge on both sides of the device. In addition, the waist belt or strap may be attached at each end to one of the two carabiners through an attachment portion, wherein the attachment portion also allows the length of the waist belt or strap to be adjustable to fit the user's body size or the size of the object to be carried.

The disclosure further provides a mechanism by which the two carabiners, one of which may be slightly larger than the other, are securely and reversibly interlocked together, thereby preventing the two carabiners from coming apart when the system is worn as a belt buckle. The small carabiner can be inserted into a center opening or hole in the larger carabiner so that the small carabiner can sit on top of the larger one. The two carabiners fit into each other by a narrowed neck at the base of the smaller carabiner so that the two carabiners interlock and fit anti-parallel to one another. The openings of the two carabiners are at opposite sides to each other when the two are interlocked providing fixed edges when combined. Thus, the two carabiners form one interlocked unit and serve to a function as a belt buckle when not in use as separate carabiners.

The two carabiners can reversibly interlock together with each other at one end of the larger carabiner via a lip that projects upwardly off the top inner edge of the larger carabiner. The two carabiners further interlock with each other at the other end of the larger carabiner via a pair of inwardly projecting protrusions or tabs from the bottom edge of the larger carabiner. The narrowed neck of the smaller carabiner rests between two inwardly projecting protrusions or tabs from the opening of the larger carabiner that allows both carabiners to sit securely against each other. The upwardly projecting raised lip portion on the inner edge of the larger carabiner and the pair of inwardly projecting protrusions or tabs from the bottom edge of the larger carabiner keeps the smaller carabiner in place and prevents it from detaching from the device. Only when the smaller carabiner is pushed away from the curvature of the lip and away from the two protrusions or tabs can it then be lifted away from the larger carabiner thus enabling the release of the smaller carabiner from the larger carabiner and the two come apart. The combination of the upwardly projecting raised lip and inwardly projecting protrusions or tabs on the larger carabiner work in concert with the smaller carabiner to achieve the desired interlocking mechanism. Tension on the waist belt or strap keeps the two carabiners joined and interlocked together, whereas release of the tension allows the user to release the two carabiners from their interlocked position.

A gate portion on each of the two carabiners, which can be opened or closed by pushing on an end of the arm that is not attached to the body of the carabiner, pivots the arm from the attached end. When the gate is in a closed the position, the gate extends between the top and the bottom of the carabiners.

The two carabiners also include base portion, which contains an attachment portion where the waist belt or carrying strap with the two ends can be secured onto the carabiners.

A variation of the base attachment portions allows different types of waist belt or straps to be attached to the two carabiners. Included in this application are 4 different variations of the attachment portion, for example, attachment portion having one, two, three, or four openings, and the like. The two circular-holed attachment portion and the four-holed attachment portion allow carrying straps made of circular climbing rope to be threaded. The two circular-holed attachment portion can sit perpendicular to the plane dimension of the carabiner at about a 30 degree to about a 45-degree angle to the base edge of the carabiner. The strap can be threaded at about a 90-degree angle to the plane of the carabiner allowing the strap to sit flat against the wearer of the belt. The two-holed attachment portion also can also be twisted at about a 45-degree angle against an axial plane of the carabiner, which prevents the rope from easily sliding and secures the length of the strap. The four circular-holed attachment design allows circular climbing ropes or bungee cords to be threaded through the 4 holes allowing secure attachment to the carabiners.

Another variation of the base attachment portion is the attachment with two rectangular slits, which allows a flat strap, more typical of belts to be attached to the carabiners and allows the length of the strap to be adjusted by the user.

Another variation of the base attachment portion is the attachment with one rectangular slit, which allows a flat strap of a fixed length to be attached to the carabiners.

FIG. 1 illustrates an embodiment of a top view of a reversibly interlocking carabiner device 100 for attaching or securing one or more objects to a strap, belt or rope. As shown in this figure, the device 100 is unlocked and includes a first carabiner 101, which has a first gate opening 102; a first gate 103 that opens and closes the first gate opening 102; and a first spring mechanism 104, which acts as a pivot point and secures the first gate 103 against a first hook 105.

The first carabiner 101 also includes a first base portion 106, which can be connected to a first strap attachment 107 through an optional first bend 108. The first bend 108 may be connected to the first base portion 106 and the first strap attachment 107 such that the first bend 108 locates the first strap attachment 107 below a plane of the first carabiner 101. The first carabiner 101 may also include one or more openings 109 in the first strap attachment 107, which may be configured to be of any size or shape in order to accommodate attaching or securing a first end of a strap 110, which is shown in a cut-away view for convenience. The first carabiner 101 further includes a first proximal end 111 having an upwards protruding lip 112; and a first distal end 113 configured to include two inwardly protruding tabs 114.

As shown in FIG. 1, the device 100 also includes a second carabiner 115, which has a second gate opening 116, a second gate 117 that opens and closes the second gate opening 116; and a second spring mechanism 118, which acts as a pivot point and secures the second gate 117 against a second hook 119.

The second carabiner 115 also includes a second base portion 120, which is connected to a second strap attachment 121 through a second bend 122. The second bend 122 is connected to the second base portion 120 and the second strap attachment 121 such that the second bend 122 locates the second strap attachment 121 below a plane of the second carabiner 115. The second carabiner 115 may also include one or more openings 123 in the second strap attachment 121, which may be configured to be of any size or shape in order to accommodate attaching or securing the strap. The second carabiner 115 further includes a second proximal end 125; and a second distal end 126.

In FIG. 1, the strap or belt may be continuous or may include two separate strap pieces, and includes a first end 110 and a second end 124, wherein the first end of the strap 110 attaches through the one or more openings 109 in the first strap attachment 107 of the first carabiner 101, and the second end of the strap 124 attaches through the one or more openings 123 in second strap attachment 121 of the second carabiner 115.

Figure 2:
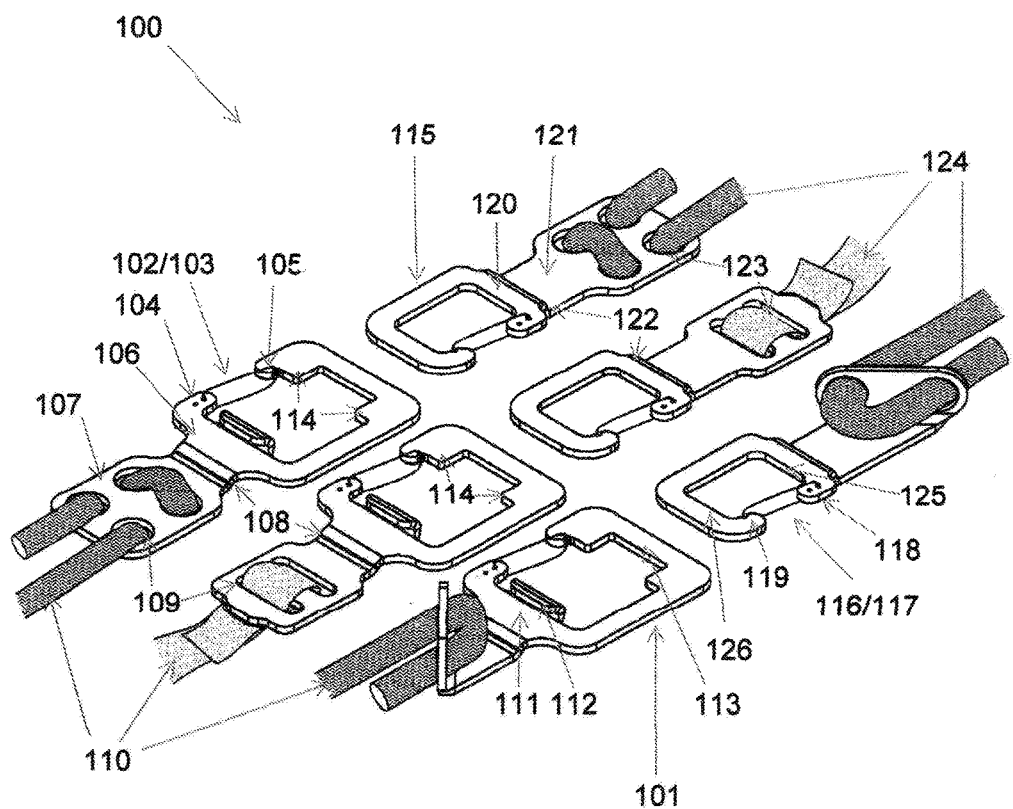
FIG. 2 illustrates other embodiments of a top view of several unlocked reversibly interlocking carabiner devices for attaching or securing an object to a strap.

FIG. 2 illustrates other embodiments of a top view of several reversibly interlocking carabiner devices 100 for attaching or securing objects to a strap. As shown in this figure, the first strap attachment 107 includes two or more openings 109; and the second strap attachment 121 includes two or more openings 123, each of which may be configured to be of any size or shape in order to accommodate attaching or securing the strap.

As shown in FIG. 2, the first strap attachment 107 may be straight and/or parallel with the first carabiner 101, or the first strap attachment 107 may be below the plane of the first carabiner 101 by virtue of the first bend 108 in the first base portion 106; and the second strap attachment 121 may be located below a plane of the second carabiner 115 by virtue of the second bend 122 in the second base portion 120. In addition, the first strap attachment 107 may be located at about a 90 degree angle vertical relative to the first base portion 106; and at about a 30 degree to a 45 degree angle horizontal relative to the first base portion 106; and the second strap attachment 121 may be located at about a 90 degree angle vertical relative to the second base portion 120 and at about a 30 degree to a 45 degree angle horizontal relative to the second base portion 120.

Figure 3:
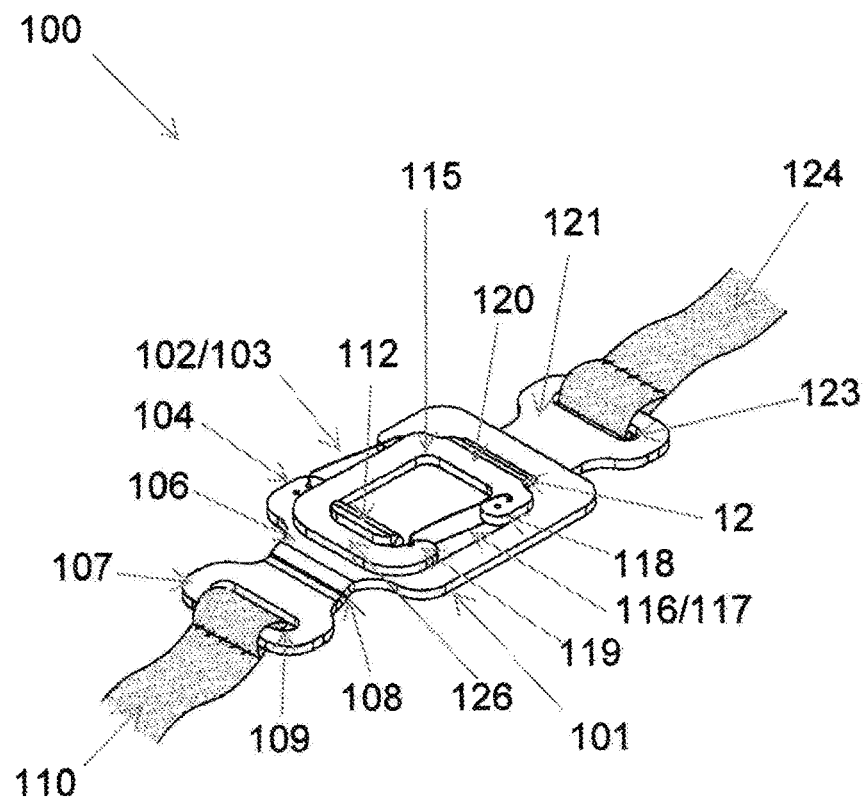
FIG. 3 illustrates an embodiment of a top view of a locked reversibly interlocking carabiner device for attaching or securing an object to a strap.

FIG. 3 illustrates an embodiment of a top view of a reversibly interlocking carabiner device for attaching or securing objects to a strap. The device 100 is interlocked and includes the first carabiner 101, which has the first gate opening 102; the first gate 103 that opens and closes the first gate opening 102; and the first spring mechanism 104, which acts as a pivot point and secures the first gate 103 against the first hook 105.

The first carabiner 101 also includes the first base portion 106, which is connected to the first strap attachment 107 through the optional first bend 108. The first bend 108 may be connected to the first base portion 106 and the first strap attachment 107 such that the first bend 108 locates the first strap attachment 107 below the plane of the first carabiner 101. The first carabiner 101 may also include the one or more openings 109 in the first strap attachment 107, which may be configured to be of any size or shape in order to accommodate attaching or securing the strap. The first carabiner 101 further includes the first proximal end 111 having an upwards protruding lip 112; and a first distal end 113 configured to include two inwardly protruding tabs 114.

As shown in FIG. 3, the device 100 also includes the second carabiner 115, which has the second gate opening 116; the second gate 117 that opens and closes the second gate opening 116; and the second spring mechanism 118, which acts as the pivot point and secures the second gate 117 against the second hook 119.

The second carabiner 115 also includes the second base portion 120, which is connected to the second strap attachment 121 through the second bend 122. The second carabiner 115 may also include the one or more openings 123 in the second strap attachment 121, which may be configured to be of any size or shape in order to accommodate attaching or securing the strap. The second carabiner 115 further includes the second proximal end 125; and the second distal end 126.

As shown in FIG. 3, the upwards protruding lip 112 on the first proximal end 111 and the two inwardly protruding tabs 114 on the first distal end 113 of the first carabiner 101 act to secure the second distal end 126 and the second proximal end 125 of the second carabiner 115, respectively. It is understood that tension in the strap connecting the first carabiner 101 and the second carabiner 115 as described above, secures or locks the device 100 together. Conversely, release of tension in the strap allows the device 100 to unlock, wherein the first end of the strap includes the first carabiner 101 and the second end of the strap 124 includes the second carabiner 115, in which these carabiners may be used to attach or secure various objects.

Figure 4:
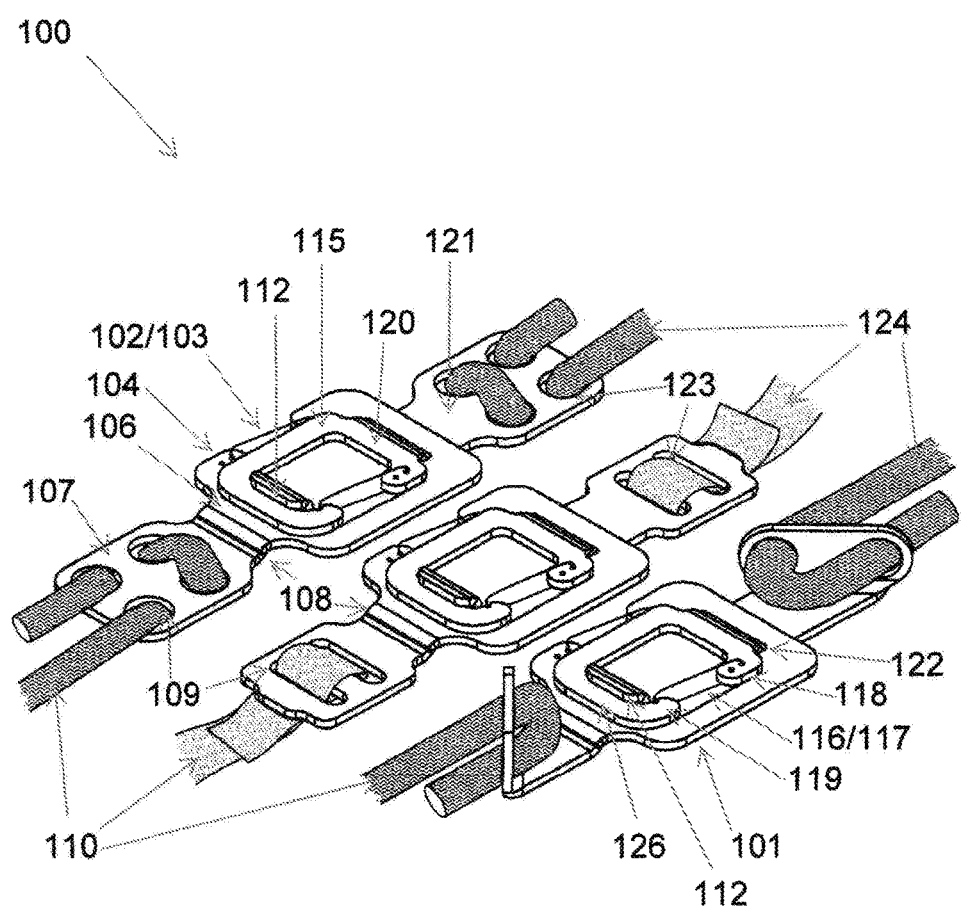
FIG. 4 illustrates other embodiments of a top view of several locked reversibly interlocking carabiner devices for attaching or securing an object to a strap.

FIG. 4 illustrates other embodiments of a top view of several interlocked reversibly interlocking carabiner devices for attaching or securing objects to a strap. As shown in this figure, the first strap attachment 107 includes two or more openings 109; and the second strap attachment 121 includes two or more openings 123, each of which may be configured to be of any size or shape in order to accommodate attaching or securing the strap.

As shown in FIG. 4, the first strap attachment 107 may be straight and/or parallel with the first carabiner 101, or the first strap attachment 107 may be below the plane of the first carabiner 101 by virtue of the first bend 108 in the first base portion 106; and the second strap attachment 121 is located below a plane of the second carabiner 115 by virtue of the second bend 122 in the second base portion 120. In addition, the first strap attachment 107 may be located at about a 90 degree angle vertical relative to the first base portion 106; and at about a 30 degree to a 45 degree angle horizontal relative to the first base portion 106; and the second strap attachment 121 may be located at about a 90 degree angle vertical relative to the second base portion 120 and at about a 30 degree to about a 45 degree angle horizontal relative to the second base portion 120.

As shown in FIG. 4, the upwards protruding lip 112 on the first proximal end 111 and the two inwardly protruding tabs 114 on the first distal end 113 of the first carabiner 101 act to secure the second distal end 126 and the second proximal end 125 of the second carabiner 115, respectively, for each of the devices 100.

It should be readily understood by those persons skilled in the art that the present disclosure is susceptible of a broad utility and application. Many embodiments and adaptations of the present disclosure other than those herein described, as well as many variations, modifications and equivalent arrangements can be apparent from or reasonably suggested by the present disclosure and the foregoing description thereof, without departing from the substance or scope of the present invention. Accordingly, while the present disclosure has been described herein in detail in relation to its embodiments, it is to be understood that this disclosure is only illustrative and exemplary of the present disclosure and is made merely for purposes of providing a full and enabling disclosure of the invention. The foregoing disclosure is not intended or to be construed to limit the present disclosure or otherwise to exclude any such other embodiment, adaptations, variations, modifications and equivalent arrangements, the present disclosure being limited only by the claims appended hereto and the equivalents thereof.

What is claimed is:

1. A reversibly interlocking device for attaching one or more objects to a strap, comprising:
    a first carabiner including a first base portion with a first strap attachment, a first proximal end including at least one lip, and a first distal end including two or more tabs; and
    a second carabiner including a second base portion with a second strap attachment, a second proximal end, and a second distal end,
    wherein the first carabiner reversibly interlocks with the second carabiner through the at least one lip interacting with the second distal end, and through the two or more tabs interacting with the second proximal end.

2. The device of claim 1, further comprising:
    one or more openings in the first strap attachment; and
    one or more openings in the second strap attachment.

3. The device of claim 2, further comprising:
    at least one strap having a first end and a second end, wherein the first end of the at least one strap attaches through the one or more openings in the first strap attachment, and the second end of the at least one strap attaches through the one or more openings in second strap attachment.

4. The device of claim 2, wherein the one or more openings in the first strap attachment includes one opening, two openings, three openings, or four openings, and the one or more openings in the second strap attachment includes one opening, two openings, three openings, or four openings.

5. The device of claim 1, wherein the first base portion includes a first bend, wherein the first bend locates the first strap attachment below a plane of the first carabiner.

6. The device of claim 1, wherein the second base portion includes a second bend, wherein the second bend locates the second strap attachment below a plane of the second carabiner.

7. The device of claim 1, wherein the at least one lip secures the second distal end.

8. The device of claim 1, wherein the two or more tabs secures the second proximal end.

9. The device of claim 1, wherein the first strap attachment is at about a 90 degree angle vertical relative to the first base portion and at about a 30 degree to a 45 degree angle horizontal relative to the first base portion, and the second strap attachment is at about a 90 degree angle vertical relative to the second base portion and at about a 30 degree to a 45 degree angle horizontal relative to the second base portion.

10. A system, comprising:
    a first carabiner including a first base portion with a first strap attachment, a first proximal end including at least one lip, and a first distal end including two or more tabs;
    a second carabiner including a second base portion with a second strap attachment, a second proximal end, and a second distal end; and
    at least one strap having a first end and a second end, wherein the at least one strap attaches to the first strap attachment through one or more openings in first strap attachment, and the at least one strap attaches to the second strap attachment through one or more openings in the second strap attachment,
    wherein the first carabiner reversibly interlocks with the second carabiner through the at least one lip interacting with the second distal end, and through the two or more tabs interacting with the second proximal end.

11. The system of claim 10, wherein the first base portion includes a first bend that places the first base portion below a plane of the first carabiner.

12. The system of claim 10, wherein the second base portion includes a second bend that places the second base portion below a plane of the second carabiner.

13. The system of claim 10, wherein the at least one lip secures the second distal end.

14. The system of claim 10, wherein the two or more tabs secures the second proximal end.

15. The system of claim 10, wherein the one or more openings in the first strap attachment includes one opening, two openings, three openings, or four openings; and the one or more openings in the second strap attachment includes one opening, two openings, three openings, or four openings.

16. The system of claim 10, wherein the first strap attachment is at about a 90 degree angle vertical relative to the first base portion and at about a 30 degree to a 45 degree angle horizontal relative to the first base portion, and the second strap attachment is at about a 90 degree angle vertical relative to the second base portion and at about a 30 degree to a 45 degree angle horizontal relative to the second base portion.

\* \* \* \* \*